(12) United States Patent
Yang et al.

(10) Patent No.: US 12,727,724 B2
(45) Date of Patent: *Sep. 8, 2026

(54) MOVABLE ROBOT CAPABLE OF IDENTIFYING SURFACE MATERIAL

(71) Applicant: PixArt Imaging Inc., Hsin-Chu County (TW)

(72) Inventors: Chung-Ting Yang, Hsin-Chu County (TW); Kai-Ho Tsai, Hsin-Chu County (TW)

(73) Assignee: PixArt Imaging Inc., Hsin-Chu County (TW)

( * ) Notice: Subject to any disclaimer, the term of this patent is extended or adjusted under 35 U.S.C. 154(b) by 89 days.

This patent is subject to a terminal disclaimer.

(21) Appl. No.: 18/956,033

(22) Filed: Nov. 22, 2024

(65) Prior Publication Data

US 2025/0082157 A1 Mar. 13, 2025

Related U.S. Application Data

(63) Continuation of application No. 18/221,084, filed on Jul. 12, 2023, now Pat. No. 12,185,902, which is a (Continued)

(51) Int. Cl.

| | |
|---|---|
| ***B25J 19/02*** | (2006.01) |
| ***A47L 9/28*** | (2006.01) |
| ***A47L 9/30*** | (2006.01) |
| ***A47L 11/40*** | (2006.01) |
| ***B25J 11/00*** | (2006.01) |

(52) U.S. Cl.

CPC ............... *A47L 9/2826* (2013.01); *A47L 9/30* (2013.01); *A47L 11/4011* (2013.01); *B25J 11/0085* (2013.01); *B25J 19/022* (2013.01); *A47L 2201/06* (2013.01)

(58) Field of Classification Search

CPC ........ A47L 9/30; A47L 9/2852; A47L 9/2805; A47L 9/2826; A47L 9/2857; A47L 11/00; A47L 2201/04; A47L 2201/06; G05D 1/02; B25J 19/023; G06T 7/0004; G06T 2207/30261

See application file for complete search history.

(56) References Cited

U.S. PATENT DOCUMENTS 11,481,918 B1 * 10/2022 Ebrahimi Afrouzi ........................ A47L 11/4008
11,744,424 B2 * 9/2023 Yang ...................... B25J 19/022 700/258

(Continued)

OTHER PUBLICATIONS

Chen et al., Intelligent Lighting Control for Vision-Based Robotic Manipulation, 2012, IEEE, p. 3254-3263 (Year: 2012).*

(Continued)

*Primary Examiner* — Mcdieunel Marc
(74) *Attorney, Agent, or Firm* — WPAT, PC

(57) ABSTRACT

There is provided a robot including a first light source, a second light source, an image sensor and a processor. The processor is used to calculate an image quality of an image frame captured by the image sensor when the second light source is being turned on. The processor then determines whether to switch the second light source back to the first light source according to the image quality to accordingly identify the material of an operation surface.

20 Claims, 4 Drawing Sheets

Related U.S. Application Data continuation of application No. 17/584,796, filed on Jan. 26, 2022, now Pat. No. 11,744,424, which is a continuation of application No. 16/541,152, filed on Aug. 15, 2019, now Pat. No. 11,278,172.

(60) Provisional application No. 62/742,502, filed on Oct. 8, 2018.

(56) References Cited

U.S. PATENT DOCUMENTS

| | | | | |
|---|---|---|---|---|
| 12,185,902 | B2 * | 1/2025 | Yang | A47L 11/4011 |
| 2020/0107689 | A1 * | 4/2020 | Yang | B25J 11/0085 |
| 2022/0066456 | A1 * | 3/2022 | Ebrahimi Afrouzi | G06F 3/04883 |
| 2024/0119614 | A1 * | 4/2024 | Ebrahimi Afrouzi | A47L 11/4011 |

OTHER PUBLICATIONS

Cowan et al., Edge-based placement of camera and light source for object recognition and location, 1993, IEEE, p. 586-591 (Year : 1993).*

Tsukiyama, Measuring the distance and orientation of a planar surface using nonstructured lighting-3-D measurement system for indoor mobile robots, 1993, IEEE, pg. 885-893 (Year: 1996).*

Zambal et al., Robotic inspection of 3D CFRP surfaces, 2016, IEEE, p. 197-202 (Year: 2016).*

* cited by examiner

MOVABLE ROBOT CAPABLE OF IDENTIFYING SURFACE MATERIAL

RELATED APPLICATIONS

The present application is a continuation application of U.S. Application Ser. No. 18/221,084, filed on Jul. 12, 2023, which is a continuation application of U.S. application Ser. No. 17/584,796, filed on Jan. 26, 2022, which is a continuation application of U.S. application Ser. No. 16/541,152, filed on Aug. 15, 2019, which claims the priority benefit of U.S. Provisional Application Ser. No. 62/742,502, filed on Oct. 8, 2018, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a cleaning robot and, more particularly, to a cleaning robot cable of distinguishing a soft or solid operation surface and performing corresponding controls.

2. Description of the Related Art

The cleaning robot has become one of various products in a smart home. The cleaning robot can be set to automatically perform the cleaning at predetermined times or controlled to start the operation via the internet.

The cleaning robot is expected to perform different cleaning functions corresponding to different operation surfaces. For example, when the cleaning robot is moving on a solid surface, water and/or detergent can be used to clean the solid surface. On the other hand, when the cleaning robot is moving on a carpet, it is necessary to prevent any liquid from wetting the carpet.

Accordingly, it is necessary to provide a cleaning robot capable of distinguishing operation surfaces of different materials.

SUMMARY

The present disclosure provides a cleaning robot having two types of light sources. The cleaning robot identifies the material or type of an operation surface according to the switching of a current operating light source.

The present disclosure further provides a cleaning robot having two types of light sources one of which (used as a material identifying light source) is operated only in performing the material identification. A processor of the cleaning robot identifies the material or type of an operation surface according to an image quality of an image frame generated by the material identifying light source.

The present disclosure provides a movable robot including a first light source, a second light source, an image sensor and a processor. The first light source is configured to illuminate an operation surface. The second light source is configured to illuminate the operation surface. The image sensor is configured to capture reflected light from the operation surface to output image frames. The processor is configured to switch an operating light source from the first light source to the second light source in identifying a material of the operation surface, and determine the material of the operation surface according to whether the operating light source is switched back to the first light source or not.

The present disclosure further provides a movable robot including a first light source, a second light source, an image sensor and a processor. The first light source is configured to illuminate an operation surface. The second light source is configured to illuminate the operation surface. The image sensor is configured to capture reflected light from the operation surface to output image frames. The processor is configured to switch an operating light source from the first light source to the second light source every predetermined time interval, and determine a material of the operation surface according to whether the operating light source is switched back to the first light source every time the operating light source switching to the second light source.

The present disclosure further provides a movable robot including a first light source, a second light source, an image sensor and a processor. The first light source is configured to illuminate an operation surface. The second light source is configured to illuminate the operation surface. The image sensor is configured to capture reflected light from the operation surface to output image frames. The processor is configured to switch an operating light source from the first light source to the second light source upon a predetermined status being detected, and determine a material of the operation surface according to whether the operating light source is switched back to the first light source or not.

In the present disclosure, the switching between two light sources is implemented by a multiplexer or an analog switch. Within an interval during which the first light source is being operated, the second light source is turned off; whereas within an interval during which the second light source is being operated, the first light source is turned off.

In the present disclosure, the operating light source is either the first light source or the second light source.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure provides a cleaning robot capable of identifying the material or type of an operation surface. The cleaning robot identifies whether the material of the operation surface changes by switching between different light sources and performs different cleaning modes corresponding to different operation surfaces. For example, on a solid surface, the cleaning robot cleans the operation surface using water and/or detergent; whereas on a carpet, it is not suitable to clean the carpet with liquid. Based on the present disclosure, it is able to improve the user experience.

Figure 1:
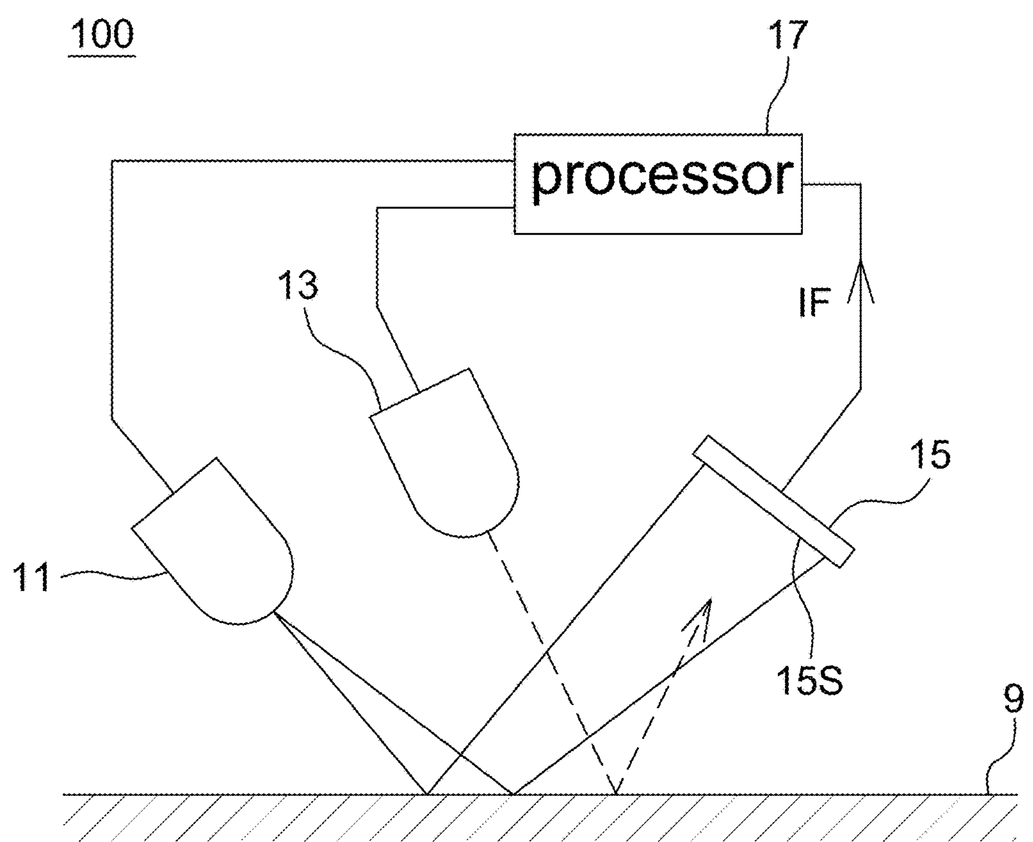
FIG. 1 is a schematic diagram of a part of components of a cleaning robot according to one embodiment of the present disclosure.

Referring to FIG. 1, it is a schematic diagram of a part of components of a cleaning robot 100 according to one embodiment of the present disclosure. The cleaning robot 100 includes a first light source 11, a second light source 13, an image sensor 15 and a processor 17. It is appreciated that FIG. 1 omits other components that are not directly related to the present disclosure. For example, the cleaning robot 100 further includes a housing containing every component, and includes at least one motor for controlling multiple tires to cause the cleaning robot 100 to move on an operation surface 9 or for changing a moving direction.

The first light source 11 uses a light emitting diode (LED) as an example herein, but not limited to. The first light source 11 is controlled by the processor 17 to generate, at a first lighting frequency, an identifiable spectrum (e.g., infrared light) to illuminate the operation surface 9 within an operating interval thereof, i.e. a time interval during which the first light source 11 is used as a current operating light source.

The second light source 13 uses a laser diode (LD) as an example herein, but not limited to. The second light source 13 is also controlled by the processor 17 to generate, at a second lighting frequency, an identifiable spectrum (e.g., infrared light) to illuminate the operation surface 9 within an operating interval thereof, i.e. a time interval during which the second light source 13 is used as a current operating light source, wherein the second lighting frequency is identical to or different from the first lighting frequency without particular limitations.

In the present disclosure, the first light source 11 and the second light source 13 are preferably arranged at a bottom surface of the cleaning robot 100. The housing of the cleaning robot 100 has an opening to allow the emission light and reflected light to pass through.

The image sensor 15 is a CMOS image sensor or a CCD image sensor, and used to capture reflected light from the operation surface 9 to output image frames IF. The image sensor 15 has a detection surface 15S which is used to receive reflected light from the operation surface 9 when the first light source 11 or the second light source 12 is being turned on. For example, the first light source 11 and the second light source 13 have different emission angles to allow the reflected light thereof to impinge on the detection surface 15S.

The processor 17 is, for example, an application specific integrated circuit (ASIC), a digital signal processor (DSP) or a microcontroller (MCU), which is coupled to the first light source 11, the second light source 13 and the image sensor 15. The processor 17 is used to control the switching between the first light source 11 and the second light source 13, and receives the image frame(s) outputted from the image sensor 15 to perform the post-processing, e.g., including calculating image quality and movement.

In one embodiment, when the cleaning robot 100 detects a predetermined status, e.g., including the cleaning robot stopping moving (e.g., collision with an obstacle), changing a moving direction (e.g., distanced from an obstacle by a predetermined distance) and/or changing a moving speed (e.g., crossing surfaces of different materials to cause a change of moving speed exceeding a variation threshold), the processor 15 switches the current operating light source (sometimes referred to operating light source as a brief hereinafter) from the first light source 11 to the second light source 13.

Figure 2:
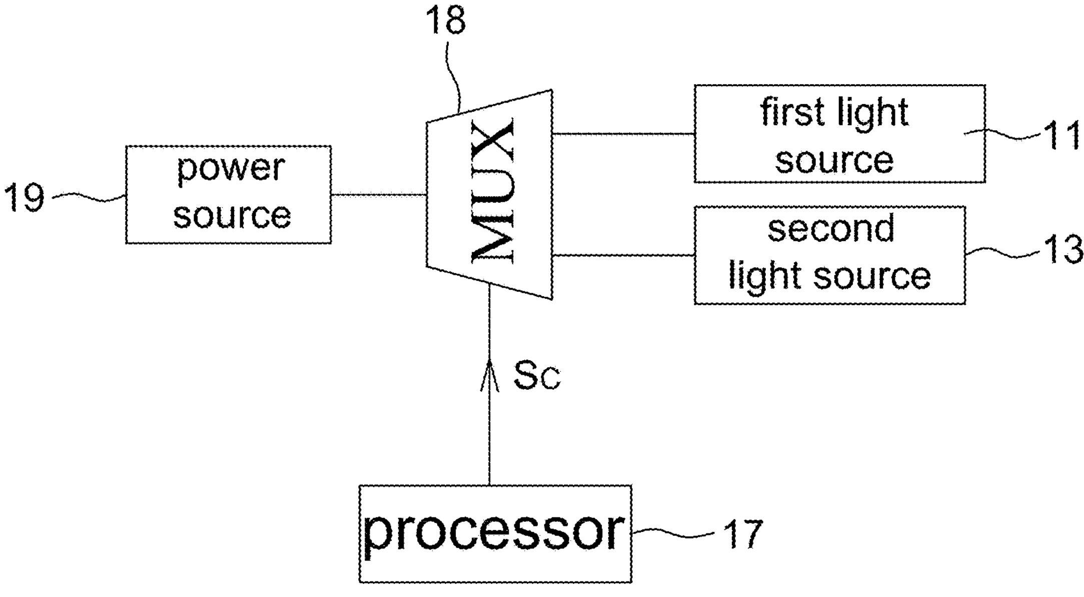
FIG. 2 is a block diagram of a part of components of a cleaning robot according to one embodiment of the present disclosure.

Referring to FIG. 2, it is a block diagram of a part of components of a cleaning robot 100 according to one embodiment of the present disclosure. The cleaning robot 100 further includes, for example, a switching element 18 and a power source 19. The power source 19 is used to provide electricity to the first light source 11, the second light source 13 and other components required during operation. The processor 17 provides a control signal Sc to the switching element 18 to cause the power source 19 to provide electricity to the first light source 11 or the second light source 13. The switching element 18 is, for example, an analog switch or a multiplexer, but not limited thereto.

Before detecting said predetermined status, the first light source 11 continuously operates at a first lighting frequency, and the processor 17 calculates a moving distance or a moving speed according to the image frame IF captured by the image sensor 15 when the first light source 11 is being turned on. The method of calculating the moving distance or moving speed is implemented by comparing two image frames (e.g., calculating the correlation between successive image frames), which is known to the art and thus details thereof are not repeated.

Figure 3A:
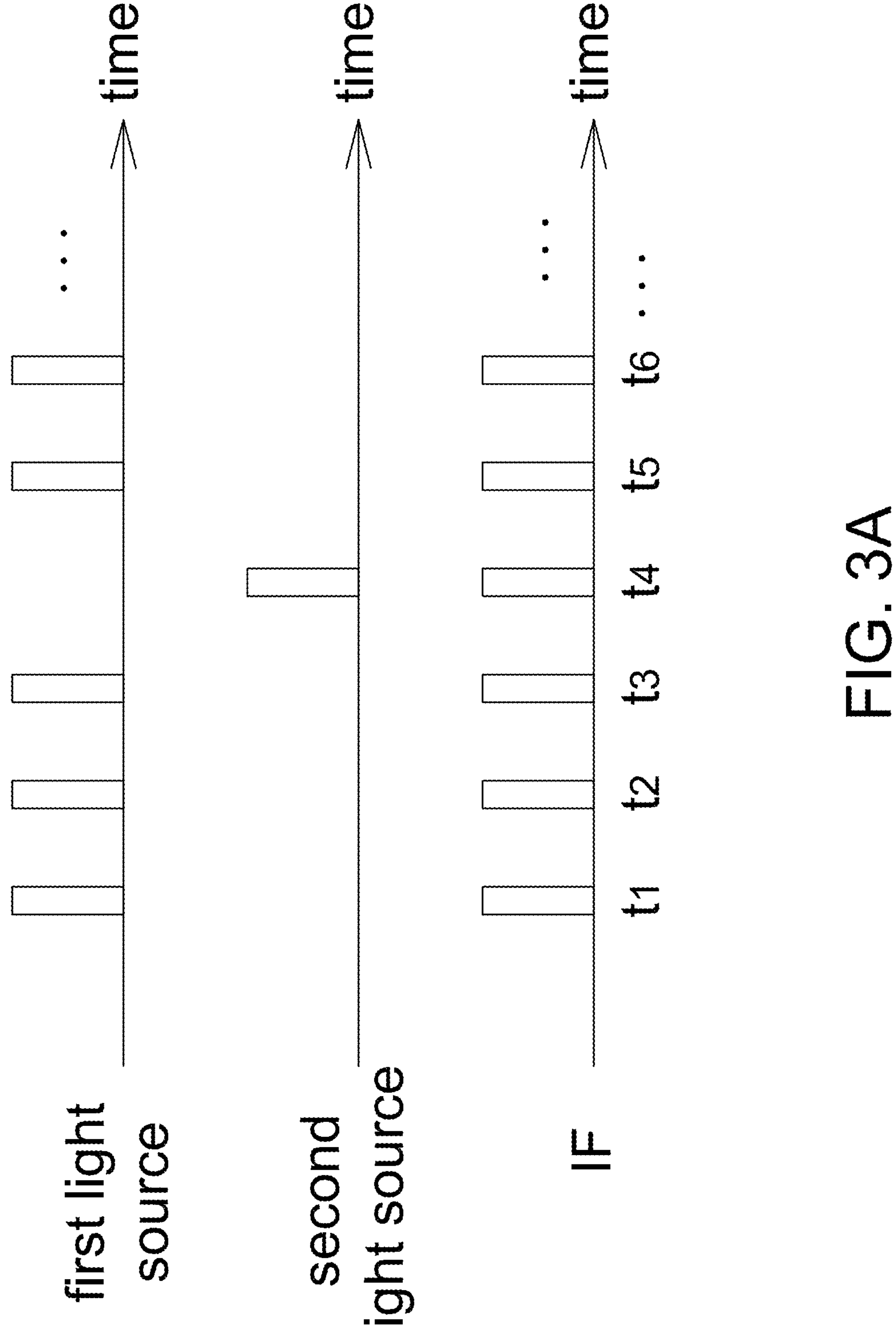
FIG. 3A is an operational schematic diagram of a cleaning robot according to one embodiment of the present disclosure.

Referring to FIG. 3A, while the predetermined status has been detected (e.g., at time t4), the processor 17 switches the operating light source from the first light source 11 to the second light source 13 to cause the second light source 13 to emit light to illuminate the operation surface 9. The processor 13 then identifies whether to switch the operating light source back to the first light source 11 according to the image frame IF captured by the image sensor 15 when the second light source 13 is being turned on. It should be mentioned that although FIG. 3A shows that a single image frame IF at time t4 is used to confirm whether to switch the operating light source back to the first light source 11, it is only intended to illustrate but not to limit the present disclosure. In other aspects, when the predetermined status has been detected, the processor 17 identifies whether to perform the light source switching according to multiple image frames IF to improve the identification accuracy.

The method of identifying whether to switch back to the first light source 11 includes calculating the image quality of the image frame IF (referred to a second image frame for illustration purposes) when the second light source 13 is being turned on, and then comparing the calculated image quality with a quality threshold. The image quality is selected from any parameter suitable to indicate the image feature of an image frame, e.g., the contrast, a number of edges, a summation of gray level differences between every pixel and its adjacent pixels, a number of pixels having a gray level difference with respect to its adjacent pixels larger than a threshold, or the blurring of the image frame, but not limited thereto.

Figure 3B:
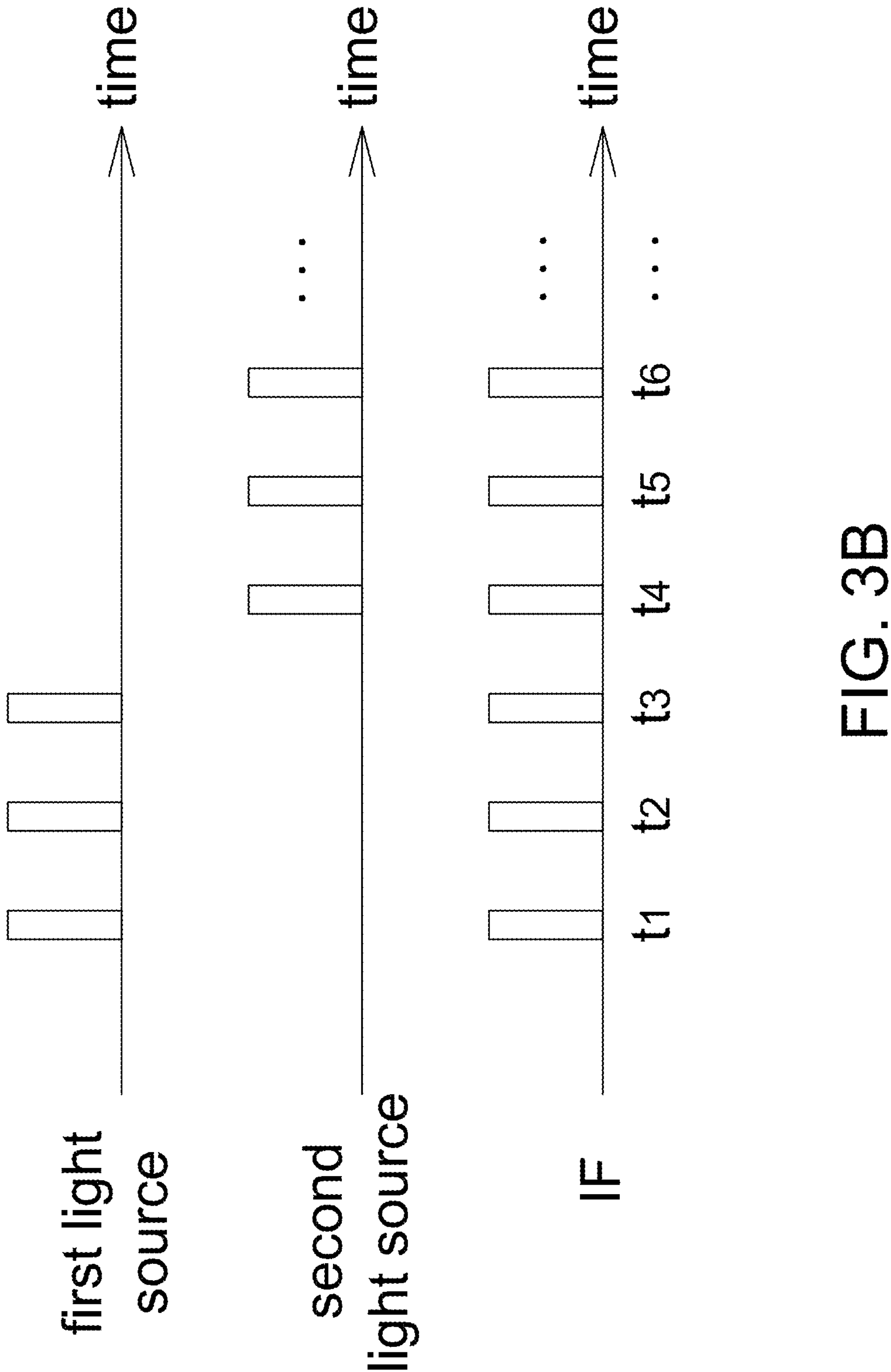
FIG. 3B is an operational schematic diagram of a cleaning robot according to another embodiment of the present disclosure.

When the second image frame has good image quality (e.g., larger than or equal to a quality threshold), the second light source 13 keeps to illuminate the operation surface 9 at a second lighting frequency (e.g., FIG. 3B showing that the operating light source is not switched back to the first light source 11 after time t4), and then the processor 17 identifies that the operation surface 9 is a second material or type. When the second image frame has a poor image quality (e.g., smaller than the quality threshold), the operating light source is switched back to the first light source 11 to illuminate the operation surface 9, and then the processor 17 identifies that the operation surface 9 is a first material or type.

In FIGS. 3A and 3B, rectangles in light source rows indicate lighting the light source, and rectangles in IF rows indicate the image capturing.

In the present disclosure, the first material is a solid surface such as a wood surface, a stone surfaced or a plastic surface, and the second material is a soft surface such as a carpet, but not limited thereto.

Referring to FIG. 3B again, when the processor 17 switches the operating light source to the second light source 13 and identifies that the operation is not required to switch back to the first light source 11 (e.g., image quality good enough), the processor 16 further calculates an image quality according to the image frame IF captured by the image sensor 15 when the second light source 13 emits light at the second lighting frequency to identify whether to switch the operating light source back to the first light source 11 after time t4. In other words, when the second light source 13 is used as the current operating light source, the processor 17 calculates the moving distance or speed according to the image frame IF captured when the second light source 13 is being turned on, and identifies whether the image quality of the captured image frame IF is not good enough to accordingly switch the operating light source back to the light source 11, e.g., after time t4.

In another embodiment, the processor 17 controls the first light source 11 to continuously illuminate the operation surface 9 at a first lighting frequency. Every predetermined time interval, the processor 17 controls the operating light source from the first light source 11 to the second light source 13, and identifies the material of the operation surface 9 according to the image quality of the image frame IF (referred to second image frame for illustration purposes) captured by the image sensor 15 when the second light source 13 is being turned on. When the image quality of the second image frame is larger than a quality threshold, the processor 17 identifies that the material or type of the operation surface 9 does not change, e.g., the operation surface 9 being identified as a solid surface before and after the light source switching. When the image quality of the second image frame is smaller than the quality threshold, the processor 17 identifies that the material or type of the operation surface 9 changes, e.g. the operation surface 9 changing from a solid surface to a soft surface after the light source switching. In this way, it is able to recognize the surface material according to the operation of light source switching.

In one aspect, after the material identification which indicates the image quality of the second image frame is smaller than the quality threshold, the processor 17 switches the operating light source from the second light source 13 back to the first light source 11 (no switching if larger than or equal to the quality threshold). As shown in FIG. 3A, the processor 17 identifies the surface quality using one second image frame, but not limited to using a single second image frame. When the image quality of the second image frame is larger than the quality threshold, the processor 17 controls the second light source 13 to continuously operate (e.g., times t5, t6 . . . shown in FIG. 3B) at a second lighting frequency, and calculates the moving distance and/or speed according to the second image frame.

In another aspect, after obtaining the image quality, the processor 17 switches the operating light source from the second light source 13 back to the first light source 11 because the first light source 11 is suitable to both the soft and solid surfaces. That is, the processor 17 turns on the second light source 13 only for identifying the material of the operation surface 9. Within the time interval not for identifying the material of the operation surface 9, the processor 17 calculates the moving distance and/or speed of the cleaning robot 100 with respect to the operation surface 9 according to the image frame IF captured by the image sensor 15 when the first light source 11 is being turned on.

In an alternative embodiment, before the predetermined status has been detected, the processor 17 controls the first light source 11 to emit light to illuminate the operation surface 9 at a first lighting frequency. When the predetermined status has been detected, the processor 17 switches the operating light source from the first light source 11 to the second light source 13. When the operating light source is not switched back to the first light source 11, the processor 17 controls the cleaning robot 100 to operate at a first cleaning mode; whereas, when the operating light source is switched back to the first light source 11, the processor 17 controls the cleaning robot 100 to operate at a second cleaning mode. In the present disclosure, the cleaning robot 100 preferably performs different functions corresponding to different surfaces.

In one aspect, the first cleaning mode includes cleaning the operation surface 9 using liquid, e.g., a better cleaning effect being achieved on a solid surface using liquid. In the second cleaning mode, the processor 17 stops cleaning the operation surface 9 using the liquid. For example, the processor 17 controls a gate of a container for containing liquid. When a soft surface is identified, the gate is closed to prevent the liquid therein from going out. However, the cleaning modes of the present disclosure are not limited to using the liquid or not. For example, in the first cleaning mode, a first wind force is used to collect scraps and dusts on the operation surface 9; whereas, in the second cleaning mode, a second wind force different from the first wind force (e.g., changing the motor intensity) is used to collect scraps and dusts on the operation surface 9.

In this embodiment, the processor 17 also identifies whether to switch the operating light source back to the first light source 11 according to the image frame IF captured by the image sensor 15 when the second light source 13 is being turned on, and since details thereof are described above, redundant descriptions are not repeated herein.

Figure 4:
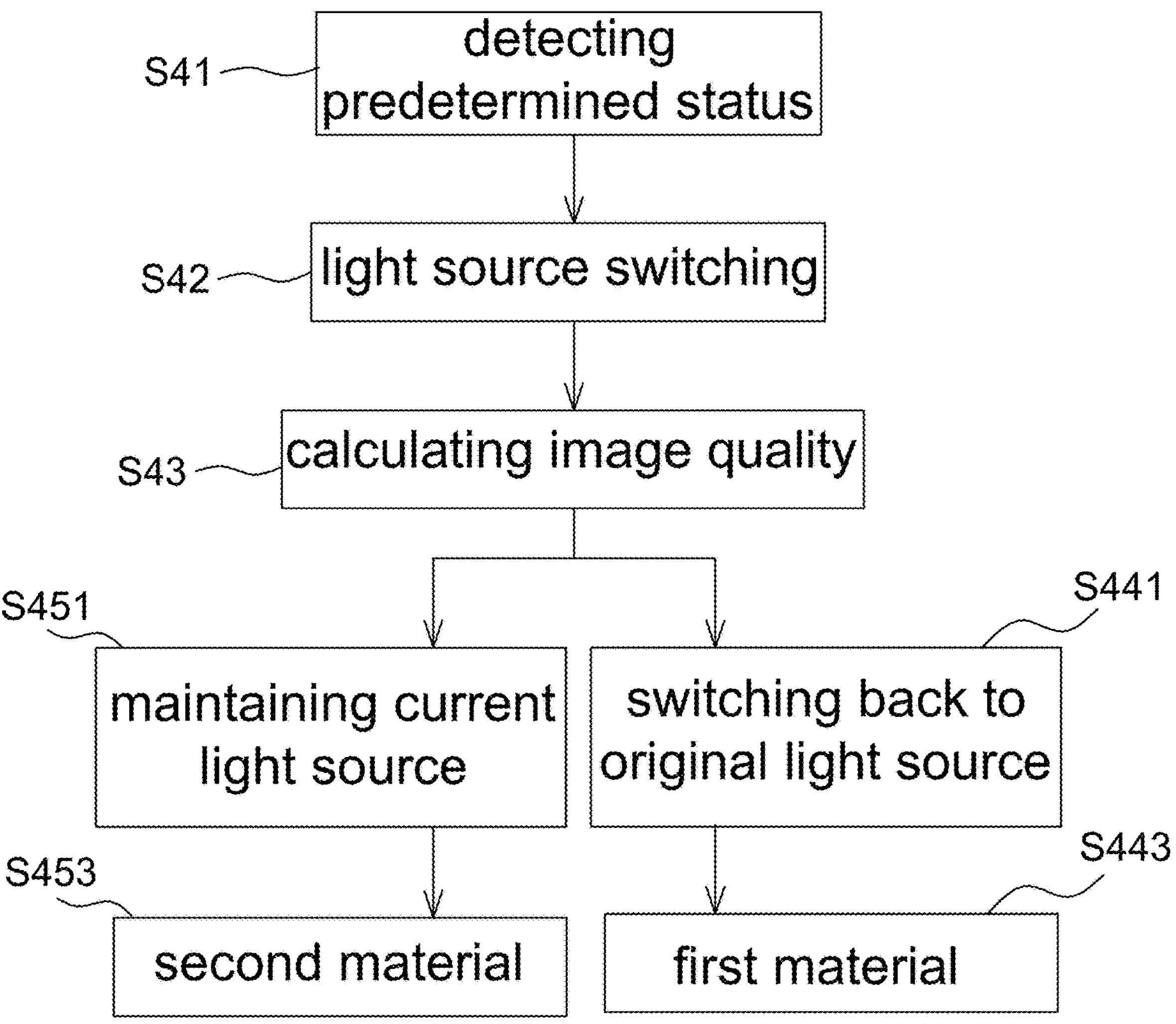
FIG. 4 is a flow chart of an operating method of a cleaning robot according to one embodiment of the present disclosure.

Referring to FIG. 4, it is a flow chart of an operating method of a cleaning robot 100 according to one embodiment of the present disclosure, which includes the steps of: detecting a predetermined status (Step S41); switching a light source (Step S42); calculating an image quality (Step S43); switching back to an original light source and identifying a first material (Steps S441-S443); and maintaining a current light source and identifying a second material (Steps S451-S453). Referring to FIGS. 1-4 together, details of this embodiment are described below.

Step S41: As mentioned above, the processor 17 is arranged to identify the predetermined status as stopping moving, changing a moving direction and/or changing a moving speed. It is appreciated that the processor 17 receives a signal from the motor that controls the rotation of tires and the turning of moving direction to detect the predetermined status. The processor 17 also detects whether the moving speed is changed directly according to the image frame IF or according to the signal from the motor or another sensor.

Step S42: when the processor 17 detects the occurrence of predetermined status (or receiving the signal indicating the occurrence of predetermined status), the processor 17 performs the light source switching via the switching element 18. For example, FIGS. 3A and 3B show that the operating light source is switched from the first light source 11 to the second light source 13 at time t4.

Step S43: Next, when the second light source 13 is being turned on, the processor 17 receives an image frame IF (referred to second image frame for illustration purposes) captured by the image sensor 15 and calculates an image quality thereof. The processor 17 identifies whether to switch the current operating light source again and accordingly recognizes the surface material according to a comparison result of comparing the image quality of the second image frame and a quality threshold as mentioned above.

Steps S441-S443: When the processor 17 identifies that the second image frame has a low image quality (e.g., smaller than the quality threshold), the operating light source is switched back to the first light source 11 and a corresponding cleaning mode is executed. Meanwhile, the operation surface 9 is identified as a first material by the processor 17.

Steps S451-S453: When the processor 17 identifies that the second image frame has a high image quality (e.g., larger than or equal to the quality threshold), the operating light source is maintained at the second light source 13 and a corresponding cleaning mode is executed. Meanwhile, the operation surface 9 is identified as a second material by the processor 17. In the present disclosure, the material is indicated using, for example, a value in the register, e.g., "1" indicating a first material and "0" indicating a second material and vice versa, but the present disclosure is not limited thereto.

In FIG. 4, the processor 17 activates the material detection function in addition to the predetermined status has been detected, e.g., auto detection being performed every predetermined time interval.

It is appreciated that although a cleaning robot is taken as an example in the above embodiments, the present disclosure is not limited thereto. In other embodiments, the cleaning robot is replaced by other movable robots as along as said movable robots need to recognize the material or type of an operation surface during operation.

It is appreciated that although a single image sensor is taken as an example in the above embodiments, the present disclosure is not limited thereto. In other embodiments, the leaning robot 100 includes two image sensors respectively for receiving reflected light from the operation surface 9 generated by two light sources. For example, a first image sensor operates corresponding to the first light source 11, and a second image sensor operates corresponding to the second light source 13. When the first light source 11 is being turned on, the processor 17 processes the first image frame(s) outputted by the first image sensor; whereas, when the second light source 13 is being turned on, the processor 17 processes the second image frame(s) outputted by the second image sensor. One of ordinary skill in the art would understand the operation using two image sensors after understanding the operation using a single image sensor as mentioned above, and thus details thereof are not repeated herein.

It is appreciated that although a single first light source 11 and a single second light source 13 are shown in FIG. 1 for illustration, the present disclosure is not limited thereto. In other aspects, the first light source 11 includes multiple emitting elements (e.g., including multiple LEDs) and the second light source 13 includes multiple emitting elements (e.g., including multiple LDs).

As mentioned above, the cleaning robot is preferably capable of distinguishing different operation surfaces and performing different functions corresponding to the different operation surfaces. Accordingly, the present disclosure provides a cleaning robot (e.g., FIGS. 1-2) that identifies the surface material or type according to the switching of light sources and an operating method thereof (e.g., FIG. 4). When the surface material is a solid surface, a material identifying light source (e.g., the second light source) is operated continuously, and an original function is turned off or another function is activated. When the surface material is a soft surface, the material identifying light source is turned off, and the original function is maintained.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A movable robot, comprising:
- a first light source, configured to illuminate an operation surface;
- a second light source, configured to illuminate the operation surface;
- an image sensor, configured to capture reflected light from the operation surface to output image frames; and
- a processor, coupled to the first light source, the second light source and the image sensor, and configured to
  - switch an operating light source from the first light source to the second light source in identifying a material of the operation surface, and
  - determine the material of the operation surface according to whether the operating light source is switched back to the first light source or not.

2. The movable robot as claimed in claim 1, wherein
- when the operating light source is switched back to the first light source, the processor determines the operation surface as a first material, and
- when the second light source is maintained as the operating light source, the processor determines the operation surface as a second material, different from the first material.

3. The movable robot as claimed in claim 1, wherein a first image frame captured upon the first light source being used as the operating light source is not used to determine the material of the operation surface.

4. The movable robot as claimed in claim 1, wherein the processor is configured to calculate an image quality of a second image frame captured upon the second light source being used as the operating light source to accordingly determine whether to switch the operating light source back to the first light source.

5. The movable robot as claimed in claim 1, wherein
- the first light source is a light emitting diode, and
- the second light source is a laser diode.

6. The movable robot as claimed in claim 1, wherein the processor is configured to switch the operating light source from the first light source to the second light source when the movable robot stops moving, changes a moving direction or changes a moving speed.

7. The movable robot as claimed in claim 1, wherein the processor is further configured to calculate a moving distance or a moving speed according to first image frames captured upon the first image sensor being used as the operating light source.

8. A movable robot, comprising:

a first light source, configured to illuminate an operation surface;

a second light source, configured to illuminate the operation surface;

an image sensor, configured to capture reflected light from the operation surface to output image frames; and a processor, coupled to the first light source, the second light source and the image sensor, and configured to switch an operating light source from the first light source to the second light source every predetermined time interval, and determine a material of the operation surface according to whether the operating light source is switched back to the first light source every time the operating light source switching to the second light source.

9. The movable robot as claimed in claim 8, wherein when the operating light source is switched back to the first light source, the processor determines the operation surface as a first material, and when the second light source is maintained as the operating light source, the processor determines the operation surface as a second material, different from the first material.

10. The movable robot as claimed in claim 8, wherein a first image frame captured upon the first light source being used as the operating light source is not used to determine the material of the operation surface.

11. The movable robot as claimed in claim 8, wherein the processor is configured to calculate an image quality of a second image frame captured upon the second light source being used as the operating light source to accordingly determine whether to switch the operating light source back to the first light source.

12. The movable robot as claimed in claim 8, wherein the first light source is a light emitting diode, and the second light source is a laser diode.

13. The movable robot as claimed in claim 8, wherein the processor is configured to switch the operating light source from the first light source to the second light source when the movable robot stops moving, changes a moving direction or changes a moving speed.

14. The movable robot as claimed in claim 8, wherein the processor is further configured to calculate a moving distance or a moving speed according to first image frames captured upon the first image sensor being used as the operating light source.

15. A movable robot, comprising:

a first light source, configured to illuminate an operation surface;

a second light source, configured to illuminate the operation surface;

an image sensor, configured to capture reflected light from the operation surface to output image frames; and a processor, coupled to the first light source, the second light source and the image sensor, and configured to switch an operating light source from the first light source to the second light source upon a predetermined status being detected, and determine a material of the operation surface according to whether the operating light source is switched back to the first light source or not.

16. The movable robot as claimed in claim 15, wherein when the operating light source is switched back to the first light source, the processor determines the operation surface as a first material, and when the second light source is maintained as the operating light source, the processor determines the operation surface as a second material, different from the first material.

17. The movable robot as claimed in claim 15, wherein a first image frame captured upon the first light source being used as the operating light source is not used to determine the material of the operation surface.

18. The movable robot as claimed in claim 15, wherein the processor is configured to calculate an image quality of a second image frame captured upon the second light source being used as the operating light source to accordingly determine whether to switch the operating light source back to the first light source.

19. The movable robot as claimed in claim 15, wherein the predetermined status comprises the movable robot stopping moving, changing a moving direction or changing a moving speed.

20. The movable robot as claimed in claim 15, wherein the processor is further configured to calculate a moving distance or a moving speed according to first image frames captured upon the first image sensor being used as the operating light source.

* * * * *